United States Patent
Ito et al.

(10) Patent No.: US 6,818,677 B1
(45) Date of Patent: Nov. 16, 2004

(54) PROCESS FOR PRODUCING WATER-SOLUBLE POLYMER

(75) Inventors: Kenji Ito, Aichi (JP); Tetsuya Tsuzuki, Aichi (JP); Juichi Gotoh, Aichi (JP); Susumu Miho, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 0 days.

(21) Appl. No.: 10/240,203

(22) PCT Filed: Apr. 19, 2001

(86) PCT No.: PCT/JP01/03356

§ 371 (c)(1),
(2), (4) Date: May 23, 2003

(87) PCT Pub. No.: WO01/81431

PCT Pub. Date: Nov. 1, 2001

(30) Foreign Application Priority Data

Apr. 21, 2000 (JP) ........................................ 2000-120256

(51) Int. Cl.$^7$ ............................... C08F 2/16; C08F 2/46
(52) U.S. Cl. ............................. 522/28; 522/84; 522/85; 522/62
(58) Field of Search ............................... 522/4, 28, 62, 522/84, 85

(56) References Cited

U.S. PATENT DOCUMENTS

| 4,024,040 A | * | 5/1977 | Phalangas et al. ............. 522/27 |
| 4,376,021 A | * | 3/1983 | Okamoto et al. ............... 522/4 |
| 4,762,862 A | * | 8/1988 | Yada et al. ...................... 522/3 |

FOREIGN PATENT DOCUMENTS

| JP | 53-22544 | 7/1978 |
| JP | 57-19121 | 4/1982 |
| JP | 57-115409 | 7/1982 |
| JP | 63-273609 | 10/1988 |
| JP | 63-295604 | 12/1988 |
| JP | 63-309501 | 12/1988 |
| JP | 4-57682 | 9/1992 |
| JP | 7-10895 | 2/1995 |
| JP | 10-279615 | 10/1998 |
| JP | 10-298215 | 11/1998 |
| JP | 11-35612 | 9/1999 |

OTHER PUBLICATIONS

Abstract and Machine Translation of JP 1105612, Sep. 2, 1999.*

* cited by examiner

*Primary Examiner*—Susan Berman
(74) *Attorney, Agent, or Firm*—Fitch, Even, Tabin & Flannery

(57) ABSTRACT

A process in which an aqueous solution of a vinyl monomer is subjected to photopolymerization to produce a water-soluble polymer which has a high molecular weight, is highly soluble in water, and reduced in unreacted monomer content is provided. The process comprises subjecting an aqueous solution of a vinyl monomer to photopolymerization with the aid of an azo compound having a 10-hour half-life decomposition temperature of 90° C. or lower as a photopolymerization initiator in such a manner that first-stage light irradiation is conducted at an irradiation intensity of 0.5 to 7 W/m$^2$ and second-stage or subsequent light irradiation is conducted at an irradiation intensity higher than that in the first stage and in an integrated quantity of light of 70,000 J/m$^2$ or larger.

12 Claims, No Drawings

PROCESS FOR PRODUCING WATER-SOLUBLE POLYMER

CROSS-REFERENCED APPLICATIONS

This application is a National phase of International Application PCT/JP01/03356, filed Apr. 19, 2001, which designated the U.S. and that International Application was not published under PCT Article 21(2) in English.

TECHNICAL FIELD

The present invention relates to a process for producing a water-soluble polymer. In more detail, the present invention is a process for producing a water-soluble polymer by irradiating an aqueous solution of vinyl monomer with light. The production process of this invention allows an efficient and smooth production of a water-soluble polymer that is high in molecular weight, good in water-solubility and reduced in unreacted monomer (residual monomer) content. The water-soluble polymer obtained according to this invention can effectively be used for polymeric flocculants and other various applications because of the above-mentioned properties.

BACKGROUND ART

It has been widely practiced to irradiate an aqueous solution of vinyl monomer with light, for production of a water-soluble polymer. Especially, since high molecular weight water-soluble polymers are excellent in coagulation capability, they are widely used as polymeric flocculants for coagulation of various kinds of wastewater, and are also used for such applications as thickeners, paper sizing agents, paper strength agents, drainage agents, fiber-modifying agents and dyeing assistants. However, the water-soluble polymer produced by photopolymerization is apt to be high in unreacted monomer content. If a water-soluble polymer contains a large amount of unreacted monomer, for example, in use as a polymeric flocculant for treatment of wastewater, the wastewater obtained after the coagulation also contains a large amount of unreacted monomer to pose a problem of environmental pollution or the like. Furthermore, even when the water-soluble polymer high in unreacted monomer content is used for other applications, undesirable results often occur in terms of safety and others. From this point of view, a water-soluble polymer low in unreacted monomer content is demanded.

As processes for decreasing the unreacted monomer content of water-soluble polymers derived from vinyl monomers (hereinafter such polymers are also simply called "water-soluble polymer(s)"), have been proposed (i) a process for producing a water-soluble polymer by light irradiation using a benzyl dimethyl ketal as a photopolymerization initiator (JP-A-57-115409), (ii) a process for producing a water-soluble polymer by carrying out a first light irradiation step in a vessel with a depth of 50 mm or less under cooling using a benzoin alkyl ether or the like as a photopolymerization initiator, terminating the cooling, and carrying out a second light irradiation step a certain period of time after the termination of the cooling (JP-A-63-295604), (iii) a process for effecting polymerization in a vessel with a depth of 50 mm or less under light irradiation using a benzoin alkyl ether or the like as a photopolymerization initiator to produce a gelled polymer, and again exposing the surface of the gelled polymer that has been in contact with the inner wall of the vessel to light so that the monomer remaining on the surface of the gelled polymer is polymerized (JP-A-63-309501), (iv) a polymerization process which comprises a plurality of stages of irradiating an aqueous solution of vinyl monomer with light, in which the intensity of light is gradually increased in stages of the second and subsequent irradiation (JP-A-11-35612), (v) a process of producing a water-soluble polymer comprising the first step of irradiating an aqueous solution of vinyl monomer with a ray of light excluding a specific wavelength of light, and the second and subsequent steps of irradiating it with a ray of light including the above specific wavelength of light (JP-A-10-279615 and JP-A-10-298215), etc.

However, the above process (i) is liable to cause crosslinking reaction, thereby rendering the obtained water-soluble polymer to be insufficient in water-solubility, and is not always satisfactory in the effect of lowering the unreacted monomer content. Further, the processes (ii) and (iii) have some effect on decrease in unreacted monomer but are still insufficient, and also have a problem in that water-soluble polymers high in polymerization degree are not readily produced. The process (iv) requires the intensity of light to increase gradually in the second and subsequent stages for polymerization, thereby making the equipment and operation complicated undesirably. Moreover, the process (v) requires a filter for removing the light of a specific wavelength in the first light irradiation step, thereby making the equipment complicated and wasting light energy, and thus is not an efficient process. In addition, the process (v) is not desirable since the filter is extremely heated due to absorption of light energy, and there might be a risk of a fire in some cases.

Further, processes for photopolymerization of vinyl monomer using azo compounds as photopolymerization initiators are conventionally known (JP-B-53-22544, JP-B-57-19121, etc.). In such conventional processes using azo compounds, however, high molecular weight water-soluble polymers cannot readily be obtained, and thus these water-soluble polymers do not satisfactorily serve for such applications as flocculants.

Furthermore, known is a process for producing a water-soluble polymer, in which an aqueous solution of a cationic (meth)acrylate monomer containing a photopolymerization initiator such as benzoin, benzoin alkyl ether, benzyl, benzophenone and anthraquinones and another photopolymerization initiator composed of an azo compound, or a mixture of said cationic (meth)acrylate monomer with another vinyl monomer, is fed as a layer with a thickness of 3 to 18 mm onto a moving belt and is irradiated with light in the first and second steps at selected wavelengths and intensities, and then the resulting rubbery polymer sheet is taken from the moving belt, further irradiated with light, cut into small pieces and dried (JP-B-4-57682 and JP-B-7-10895). However, this process is apt to cause crosslinking reaction, thereby rendering the obtained water-soluble polymer to be insufficient in water-solubility, and is not sufficiently satisfactory in terms of decrease in unreacted monomer content.

The object of the present invention is to provide a process in which a water-soluble polymer that is high in molecular weight, good in water-solubility and low in unreacted monomer content is efficiently and smoothly produced.

DISCLOSURE OF THE INVENTION

To solve the above-mentioned problems, the inventors have intensively studied and, as a result, have found that a water-soluble polymer which is high in molecular weight, excellent in water-solubility and low in unreacted monomer content can be obtained by a production process of a water-soluble polymer comprising steps for irradiation of an aqueous solution of vinyl monomer with light, in which the first light irradiation step is carried out at a specific irradiation intensity, and subsequently the second or subsequent light irradiation step is carried out under a specific condition, whilst an azo compound with a 10-hour half-life decomposition temperature of 90° C. or lower is especially used as a photopolymerization initiator. Also, the inventors have found that, according to the above-mentioned specific production process, even when the light irradiation is carried out with a depth of the aqueous solution of vinyl monomer being kept at 50 mm or more, polymerization of the vinyl monomer can be achieved in the entire aqueous solution so as to efficiently and smoothly yield a water-soluble polymer high in molecular weight, excellent in water-solubility and low in unreacted monomer content. Based on these findings, the present invention has been completed.

That is, the present invention relates to (1) a process for producing a water-soluble polymer, including steps of irradiating a photopolymerization initiator-containing aqueous solution of vinyl monomer with light using an azo compound having a 10-hour half-life decomposition temperature of 90° C. or lower as the photopolymerization initiator, which comprises a first step of carrying out the light irradiation at an irradiation intensity of 0.5 to 7 W/m$^2$, and a second or subsequent step of carrying out the light irradiation at an irradiation intensity higher than that of the first step and in an integrated quantity of light of 70,000 J/m$^2$ or more.

Furthermore, the present invention includes the following preferred embodiments:

(2) A process for producing a water-soluble polymer according to said (1), wherein the light irradiation of the first step is terminated after the temperature of the resultant polymer at the central portion thereof has reached a peak temperature, for shifting to the light irradiation of the second step.

(3) A process for producing a water-soluble polymer according to said (1) or (2), wherein the second or subsequent light irradiation step is carried out with the temperature of the polymer being kept higher than the 10-hour half-life decomposition temperature of said azo compound.

(4) A process for producing a water-soluble polymer according to any one of said (1) through (3), wherein said vinyl monomer is acrylamide alone or a mixture of acrylamide and another copolymerizable vinyl monomer, said acrylamide constituting 10 mol % or more of said mixture.

(5) A process for producing a water-soluble polymer according to said (4), wherein the mixture of acrylamide and another copolymerizable vinyl monomer is a cationic monomer mixture of acrylamide and at least one of quaternary salts and tertiary salts of dimethylaminoethyl (meth)acrylate, the salts constituting 5 mol % or more of the mixture.

The present invention is described below in detail.

The vinyl monomer used in this invention may be any vinyl monomer as long as it is soluble in water and can be polymerized by irradiation with light in the presence of a photopolymerization initiator. Examples of the vinyl monomer include (meth)acrylamides such as (meth)acrylamide and methylol (meth)acrylamide; dialkylaminoalkyl (meth) acrylates such as dimethylaminoethyl (meth)acrylate, their tertiary salts including hydrochlorides and sulfates thereof, and their quaternary salts including their addition products with an alkyl halide such as methyl chloride and addition products with an aryl halide such as benzyl chloride; (meth) acrylic acids and their alkali metal salts such as sodium salts or ammonium salts; acrylamidealkanesulfonic acids such as acrylamide-2-methylpropanesulfonic acid and its alkali metal salts or ammonium salts; N-substituted derivatives of (meth)acrylamides such as N-methyl(meth)acrylamide, N,N-dimethyl(meth)acrylamide, N-ethyl(meth)acrylamide, and N,N-diethyl(meth)acrylamide; tertiary salts such as hydrochlorides and sulfates of N,N-dialkylaminoalkyl (meth)acrylamides, and their quaternary salts including their addition products with an alkyl halide such as methyl chloride and addition products with an aryl halide such as benzoyl chloride; dialkyldiallylammonium salts such as dimethyldiallylammonium chloride; hydroxyalkyl (meth) acrylates such as hydroxyethyl (meth)acrylate, and hydroxypropyl (meth)acrylate. In this invention, the aforesaid vinyl monomers may be used alone or in combination of two or more.

Furthermore, to such an extent that water solubility of the resultant water-soluble polymer is not impaired, one or more of water-insoluble vinyl monomers, for example, (meth) acrylonitrile, (meth)acrylic acid esters such as methyl, ethyl and propyl esters of (meth)acrylic acid, and styrene can also be used in combination with an aforesaid water-soluble monomer.

In this invention, the vinyl monomer is preferably acrylamide alone or a mixture of acrylamide and another copolymerizable vinyl monomer in which said acrylamide constitutes 10 mol % or more of the mixture (hereinafter this mixture is called "acrylamide-based monomer mixture"). When an acrylamide-based monomer mixture is used as the vinyl monomer, it is preferable that the monomer mixture contains acrylamide in a proportion of 10 mol % or more and at least one of quaternary salts and tertiary salts of N,N-dialkylaminoalkyl (meth)acrylates in a proportion of 5 mol % or more, especially 10 mol % or more. As the quaternary and tertiary salts of N,N-dialkylaminoalkyl (meth)acrylates in this case, at least one of quaternary salts and tertiary salts of N,N-dimethylaminoethyl (meth)acrylate is especially preferably used since they provide water-soluble polymers excellent in coagulation capability. Generally, the quaternary and tertiary salts are used in a form of quaternary salts resulting from a reaction with methyl chloride or the like and tertiary salts such as hydrochlorides, sulfates and acetates.

Vinyl monomer content in the aqueous solution of vinyl monomer is preferably 20 to 90 wt %, more preferably 25 to 80 wt % in view of smooth progress of photopolymerization and handling properties of the resultant water-soluble polymer.

In this invention, it is necessary to carry out photopolymerization by allowing an azo compound with a 10-hour half-life decomposition temperature of 90° C. or lower [hereinafter called "azo compound (A)" in some cases] to be present as a photopolymerization initiator in the aforesaid vinyl monomer aqueous solution. As a result, a water-soluble polymer high in molecular weight, high in water-solubility and low in unreacted monomer content can be obtained. If any other photopolymerization initiator is used without using the azo compound (A), the water-soluble polymer lowered in unreacted monomer content cannot be obtained, and depending on the photopolymerization initiator, the water-soluble polymer is lowered in molecular weight or deteriorated in water-solubility.

The azo compound (A) may be any azo compound as long as it has a 10-hour half-life decomposition temperature of 90° C. or lower and can initiate the polymerization of a vinyl monomer by light irradiation.

Examples of the azo compound (A) used in this invention are enumerated as follows.
4,4'-azobis(4-cyanovaleric acid);
2,2'-azobis[N-(2-carboxyethyl)-2-methylpropionamidine];
dimethyl2,2'-azobisisobutyrate;
2,2'-azobisisobutyronitrile;
2,2'-azobis(2,4-dimethylvaleronitrile);
2,2'-azobis(2-methylbutyronitrile);
1,1'-azobis(cyclohexane-1-carbonitrile);
2,2'-azobis{2-methyl-N-[2-(1-hydroxybutyl)] propionamide};
2,2'-azobis{2-methyl-N-[2-(1-hydroxyethyl)] propionamide};
2,2'-azobis(2-amidinopropane) dihydrochloride;
2,2'-azobis[2-(5-methyl-2-imidazoline-2-yl)propane] dihydrochloride;
2,2'-azobis[2-(2-imidazoline-2-yl)propane] dihydrochloride;
2,2'-azobis[2-(2-imidazoline-2-yl)propane] disulfate;
2,2'-azobis[2-(3,4,5,6-tetrahydropyrimidine-2-yl)propane] dihydrochloride;
2,2'-azobis{2-[1-(2-hydroxyethyl)-2-imidazoline-2-yl] propane} dihydrochloride; and
2,2'-azobis[2-(2-imidazoline-2-yl)propane].

In this invention, the aforementioned azo compounds may be used alone or in combination of two or more, as the azo compound (A).

Among them, as the azo compound (A) in this invention, are preferably used one of or two or more of 2,2'-azobis(2-amidinopropane) dihydrochloride, 2,2'-azobis[N-(2-carboxyethyl)-2-methylpropionamidine] and 4,4'-azobis (4-cyanovaleric acid), since they provide water-soluble polymers further decreased in unreacted monomer content, and render the water-soluble polymers to be high in molecular weight and good in water-solubility.

The amount of the azo compound (A) to be used is preferably 100 to 10,000 ppm, more preferably 200 to 5,000 ppm, and further more preferably 500 to 2,000 ppm based on the total weight of the vinyl monomers.

In this invention, as far as the object of this invention is not impaired, other photopolymerization initiators may be used, as required, together with the azo compound (A), which include one or two of photopolymerization initiators based on benzophenone, benzoin, benzoin alkyl ethers, acetophenone, acylphosphine oxide and the like, and photosensitizers including amine-based photosensitizers such as triethanolamine and methyldiethanolamine.

Especially, if a ketone having a cyclic alkanol such as 1-benzoyl-1-hydroxycyclohexane is used as a photopolymerization initiator together with an azo compound (A), a water-soluble polymer decreased in unreacted monomer content, high in polymerization degree and high in water-solubility can further smoothly be obtained. In this case, the amount of the ketone having a cyclic alkanol to be used is 0.5 to 30 wt % based on the weight of the azo compound (A).

Furthermore, in this invention, other ingredients such as molecular weight modifiers, water-soluble organic solvents and surfactants may be used as required to such an extent that the object of this invention is not impaired.

In this invention, the vinyl monomer aqueous solution containing an azo compound (A) with a 10-hour half-life decomposition temperature of 90° C. or lower as a photopolymerization initiator is polymerized by irradiation with light in plural steps comprising the first step and the second or subsequent step. As the light for irradiation, ultraviolet light and/or visible light can be used in both the first step and the second or subsequent step, and among them, ultraviolet light is preferably used. The light source may be any light source as long as it can emit an ultraviolet and/or visible light capable of photopolymerizing the vinyl monomer. For example, a fluorescent chemical lamp, fluorescent blue lamp, metal halide lamp or high-pressure mercury lamp and the like can be used.

In this invention, it is important to carry out polymerization of vinyl monomer by irradiating an aqueous solution of vinyl monomer with light at an irradiation intensity of 0.5 to 7 $W/m^2$ in the first step. If the irradiation intensity of the first step is less than 0.5 $W/m^2$, it may happen that the vinyl monomer is not sufficiently polymerized, polymerization degree is varied between the upper portion and the lower portion of the monomer aqueous solution, thereby making it difficult to obtain a water-soluble polymer with uniform properties, and unreacted monomer content of the finally obtained water-soluble polymer is increased. On the other hand, if the irradiation intensity of the first step is more than 7 $W/m^2$, a water-soluble polymer with a high molecular weight cannot be obtained. The irradiation intensity of the first step is preferably 1 to 7 $W/m^2$, and more preferably 2 to 6 $W/m^2$.

The depth of the vinyl monomer aqueous solution during the light irradiation of the first step is, in general, preferably 100 mm or less, more preferably 20 to 65 mm, so as to allow light to reach the bottom of the aqueous solution for smooth polymerization throughout the aqueous solution. According to the process of this invention, even when the depth of the vinyl monomer aqueous solution is more than 50 mm, the vinyl monomer can be polymerized smoothly in the entire aqueous solution, and the intended water-soluble polymer can be efficiently produced.

Furthermore, the polymerization reaction by the light irradiation of the first step can be either a batch process or a continuous process. The continuous process is preferred in view of its excellent productivity.

When the light irradiation of the first step is started, it is preferred that the temperature of the vinyl monomer aqueous solution is kept in a range of 0 to 20° C., especially 5 to 15° C., since concentration of the monomer aqueous solution can be kept higher and bumping of the monomer aqueous solution can be prevented. The light irradiation of the first step allows the vinyl monomer to be polymerized, and the temperature of the aqueous solution gradually rises due to polymerization heat.

The light irradiation period of time of the first step is such that conversion of vinyl monomer in the vinyl monomer aqueous solution reaches preferably 90% or more, more preferably 95% or more, and most preferably 95 to 99.8%. Generally, conversion of 90% or more is reached when 10 to 200 minutes have passed after start of irradiation, though this depends upon kinds of vinyl monomer in use or the like. Usually if the temperature of the central portion of the vinyl monomer aqueous solution reaches a peak temperature, the conversion of vinyl monomer reaches 90% or more. Therefore, when or after the temperature of the central portion has reached a peak temperature, the light irradiation of the first step can be terminated. For example, when the vinyl vessel having an inner diameter of 300 mm until the depth of the solution reaches 50 mm, and then is irradiated with light for polymerization, the central portion corresponds to the point which is 150 mm apart from the inner wall of the polymerization vessel (center of the circle) and 25 mm deep. So, the temperature of this point is measured, and after it has reached a peak temperature, the light irradiation of the first step is terminated. When the light irradiation of the first step has been terminated, most of the vinyl monomer in the aqueous solution is polymerized, and a water-containing hydrogel polymer is usually yielded.

Then, the polymer obtained in the first step is irradiated with light in the second or subsequent step at an irradiation intensity higher than that of the first step and in an integrated light quantity of 70,000 J/m$^2$ or more. The light irradiation of the second or subsequent step may consist of the irradiation of the second step only, or may consist of that of the second and third steps, or that of plural steps, for example, from the second to fourth steps.

If the integrated light quantity of the second or subsequent step is less than 70,000 J/m$^2$, the resultant water-soluble polymer becomes high in unreacted monomer content.

The integrated light quantity of the second or subsequent step is preferably 90,000 J/m$^2$ or more, more preferably 100,000 to 2,000,000 J/m$^2$. If the integrated light quantity of the second or subsequent step is more than 2,000,000 J/m$^2$, the resultant polymer may be deteriorated in water-solubility.

The irradiation intensity of the light irradiation of the second or subsequent step must be higher than the irradiation intensity of the first step, in view of decreasing the content of unreacted monomer of the water-soluble polymer, enhancing the polymerization degree of the water-soluble polymer, and productivity. In general, the irradiation intensity is preferably 1.5 to 3,000 times the irradiation intensity of the first step, and more preferably 3 to 1,000 times. However, if the irradiation intensity is too high, the resultant water-soluble polymer becomes easy to be crosslinked. Thus, it is preferred that the irradiation intensity of the second or subsequent step is 10,000 W/m$^2$ or less.

The integrated light quantity (J/m$^2$) is obtained as a product of the irradiation intensity (W/m$^2$) multiplied by the period of time (sec), and thus the light irradiation period of time (sec) of the second or subsequent step can be obtained by dividing the integrated light quantity (J/m$^2$) of the second or subsequent step by the irradiation intensity (W/m$^2$) of the second or subsequent step.

It is preferred that the light irradiation of the second or subsequent step is carried out at a temperature higher than the 10-hour half-life decomposition temperature of the azo compound (A) used as a photopolymerization initiator, since a water-soluble polymer further decreased in unreacted monomer content can be obtained. The temperature during the light irradiation of the second or subsequent step may be controlled by external heating, or by adjustment of an initial temperature of the aqueous solution of vinyl monomer to be polymerized taking into account of a temperature rise by polymerization heat without external heating. In general, it is preferred that the light irradiation of the second or subsequent step is carried out at a temperature of 60 to 100° C.

Although the light irradiation of the second or subsequent step may be carried out in a reactor different from the light irradiation of the first step, it is preferred that the light irradiation of the second or subsequent step is carried out in the same reactor as the light irradiation of the first step continuously after the completion of the light irradiation of the first step, in view of the temperature control during the light irradiation of the second or subsequent step, simplification of equipment, economy, etc.

During the light irradiation of the second or subsequent step, unreacted monomer contained in the polymer resulting from the light irradiation of the first step is polymerized to decrease unreacted monomer content. Furthermore, the light irradiation of the second or subsequent step also functions to enhance molecular weight of the water-soluble polymer and to decompose residual photopolymerization initiators, in addition to decreasing the unreacted monomer content.

The polymer obtained after completion of the light irradiation of the second or subsequent step is generally in a form of hydrogel. The obtained hydrogel can be used as it is for respective applications, or may be cut into pieces of an adequate size (preferably about 1 to 5 mm) and dried for use. Otherwise, the cut pieces may also be further ground into a powder for use. It is generally preferred that the drying of hydrogel is carried out at a temperature of 60 to 130° C.

The thus-obtained water-soluble polymer has a high molecular weight and good solubility in water and is remarkably decreased in unreacted monomer content.

When the production process of this invention is carried out industrially, it is preferably carried out by a continuous polymerization process. As the continuous polymerization process, various processes can be employed. Among them, a process using an apparatus consisting of a continuous belt having a liquid reservoir installed in a gas-tight chamber, and a light source fixed to an upper area of the gas-tight chamber can preferably be used.

Concretely, the monomer aqueous solution is continuously supplied from one end of the continuous belt so as to maintain an intended depth. In this case, it is preferred to continuously supply an inactive gas such as nitrogen into the gas-tight chamber in order to prevent oxygen from inhibiting polymerization of the monomer. The belt continuously moves together with the monomer aqueous solution to feed the monomer aqueous solution to a position under the fixed light source. The monomer aqueous solution is polymerized by means of the light applied from the light source. This process is carried out with the light source that is divided into a section satisfying the irradiation intensity of the first step and a section satisfying the irradiation intensity and integrated light quantity of the second step.

The thus-obtained polymer sheet is cut, ground and dried into a powder product according to ordinary processes.

The water-soluble polymers obtained according to the process of this invention can be effectively used for polymeric flocculants for coagulation treatment of various kinds of wastewater, thickeners, paper sizing agents, paper strength agents, drainage agents, fiber-modifying agents, dyeing assistants and various other applications. They are especially suitable as polymeric flocculants.

Best Modes for Carrying Out the Invention

This invention is described in detail below with reference to examples, but is not limited thereto or thereby. In the following examples, 0.5% salt viscosity (mPa•s), insoluble matter content (ml) and unreacted monomer content of the water-soluble polymer obtained in each example were obtained according to the following methods.

[0.5% salted viscosity of water-soluble polymer]

The water-soluble polymer obtained in each of the following examples and comparative examples was dissolved into a 4 wt % sodium chloride aqueous solution to prepare a 0.5 wt % conc. polymer aqueous solution. While it was stirred at 25° C. and 60 rpm, the viscosity was measured by a Brookfield viscometer 5 minutes after the start of stirring.

[Insoluble matter content of water-soluble polymer]

The water-soluble polymer obtained in each of the following examples and comparative examples was dissolved into ion exchange water to prepare 400 ml of a 0.1 wt % conc. polymer aqueous solution. The entire amount of the aqueous solution was filtered using a 83-mesh sieve having a diameter of 20 cm. The insoluble matter remaining on the sieve was collected, and its volume (ml) was measured.

[Unreacted monomer content of water-soluble polymer]

Two point zero (2.0) grams of the water-soluble polymer obtained in each of the following examples and comparative examples was placed in 20 ml of a mixed solvent of acetone/water (80/20 in terms of ratio by volume), and the mixture was allowed to stand at 25° C. for 16 hours and extracted. After extraction, the supernatant solution was taken and subjected to gas chromatography to measure an amount of the unreacted monomer, and the unreacted monomer content (wt %) in the water-soluble polymer was obtained.

EXAMPLE 1

(1) To a monomer mixture consisting of 90 mol % of acrylamide and 10 mol % of a methyl chloride quaternary salt of dimethylaminoethyl acrylate, was added distilled water so as to obtain a solution of the total weight of 850 g and a monomer content of 32 wt %. The solution was placed in a cylindrical glass vessel (reactor) with an inner diameter of 146 mm, and adjusted to the pH of 4.0 using hydrochloric acid. Then, the aqueous solution was kept at a temperature of at 10° C. under nitrogen bubbling for 30 minutes to obtain a monomer aqueous solution. The liquid depth in this instance was 55 mm.

(2) To the monomer aqueous solution obtained in the above (1), 1800 ppm of 2,2'-azobis(2-amidinopropane) dihydrochloride (10-hour half-life decomposition temperature=56° C.) and 30 ppm of 1-benzoyl-1-hydroxycyclohexane, respectively based on the weight of the pure monomer content, were added as photopolymerization initiators, and nitrogen bubbling was carried out for further 2 minutes.

In this instance, a thermocouple was installed in the central portion of the monomer aqueous solution to monitor the temperature of the monomer aqueous solution or polymer.

(3) Then, as the light irradiation of the first step, four 10W chemical lamps ("FL10BL" produced by Toshiba Corp.) were lighted above the reactor at an irradiation intensity of 4.2 W/m$^2$ for 20 minutes (integrated light quantity=5,040 J/m$^2$). When the light irradiation of the first step was started, the temperature of the monomer aqueous solution began to rise suddenly, and reached a peak temperature (95° C.) 10 minutes later. Then, the temperature gradually declined to reach 90° C. 20 minutes later.

In succession, as the light irradiation of the second step, a 400 W black light ("H400BL-L" produced by Toshiba Corp.) was used to conduct light irradiation at an irradiation intensity of 300 W/m$^2$ for 30 minutes (the integrated light quantity of the second step=540,000 J/m$^2$), to obtain a hydrogel polymer. The temperature of the polymer in the second light irradiation step was 90° C. at the start of light irradiation, and 75° C. at the end of light irradiation.

(4) The hydrogel polymer obtained in the above (4) was finely cut into grains of about 3 mm in diameter, and then the grains were dried by means of a hot air dryer at 80° C. for 5 hours, and ground to yield a powdery Water-soluble polymer.

(5) The 0.5% salted viscosity, insoluble matter content and unreacted monomer content of the water-soluble polymer obtained in the above (4) were measured according to the above-mentioned methods, and were found to be as shown in the following Table 1.

EXAMPLES 2 AND 3

A water-soluble polymer was produced in the same manner as in Example 1, except that the light irradiation of the second step was carried out under the conditions shown in the following Table 1, and the 0.5% salted viscosity, insoluble matter content and unreacted monomer content of the obtained water-soluble polymer were measured according to the above-mentioned methods and were found to be as shown in the following Table 1.

EXAMPLE 4

A water-soluble polymer was produced in the same manner as in Example 3, except that only 2,2'-azobis(2-amidinopropane) dihydrochloride (10-hour half-life decomposition temperature=56° C.) was used in a proportion of 2100 ppm as a photopolymerization initiator, and the 0.5% salted viscosity, insoluble matter content and unreacted monomer content of the obtained water-soluble polymer were measured according to the above-mentioned methods and were found to be as shown in the following Table 1

COMPARATIVE EXAMPLE 1

A powdery water-soluble polymer was produced in the same manner as in Example 1, except that the light irradiation of the first step was carried out as described for Example 1, and then the reaction mixture was allowed to stand for 30 minutes with the light being turned off to yield a hydrogel polymer instead of the light irradiation of the second step. The 0.5% salted viscosity, insoluble matter content and unreacted monomer content of the obtained water-soluble polymer were measured according to the above-mentioned methods and were found to be as shown in the following Table 2.

COMPARATIVE EXAMPLE 2

A water-soluble polymer was produced in the same manner as in Example 1, except that the light irradiation of the second step was carried out under the conditions shown in the following Table 2, and the 0.5% salted viscosity, insoluble matter content and unreacted monomer content of the obtained water-soluble polymer were measured according to the above-mentioned methods and were found to be as shown in the following Table 2.

COMPARATIVE EXAMPLE 3

A water-soluble polymer was produced in the same manner as in Example 3, except that 240 ppm of 1-benzoyl-1-hydroxycyclohexane only was used as a photopolymerization initiator in place of 1800 ppm of 2,2'-azobis(2-amidinopropane) dihydrochloride (10-hour half-life decomposition temperature=56° C.) and 30 ppm of 1-benzoyl-1-hydroxycyclohexane, and the 0.5% salted viscosity, insoluble matter content and unreacted monomer content of the obtained water-soluble polymer were measured according to the above-mentioned methods and were found to be as shown in the following Table 2.

COMPARATIVE EXAMPLE 4

A water-soluble polymer was produced in the same manner as in Example 3, except that 240 ppm of benzoin ethyl ether was used as a photopolymerization initiator in place of 1800 ppm of 2,2'-azobis(2-amidinopropane) dihydrochloride (10-hour half-life decomposition temperature=56° C.) and 30 ppm of 1-benzoyl-1-hydroxycyclohexane, and the 0.5% salted viscosity, insoluble matter content and unreacted monomer content of the obtained water-soluble polymer were measured according to the above-mentioned methods and were found to be as shown in the following Table 2.

TABLE 1

| | Example 1 | Example 2 | Example 3 | Example 4 |
|---|---|---|---|---|
| Photopolymerization conditions | | | | |
| Photopolymerization initiator[1] | a and b | a and b | a and b | a |
| 10-hour half-life decomposition temperature of a (° C.) | 56 | 56 | 56 | 56 |
| The first light irradiation step: | | | | |
| Irradiation intensity (W/m$^2$) | 4.2 | 4.2 | 4.2 | 4.2 |
| Irradiation period of time (min) | 20 | 20 | 20 | 20 |
| The second light irradiation step: | | | | |
| Irradiation intensity (W/m$^2$) | 300 | 300 | 60 | 60 |
| Irradiation period of time (min) | 30 | 6 | 30 | 30 |
| Integrated light quantity (J/m$^2$) | 540,000 | 108,000 | 108,000 | 108,000 |
| Polymer temperature | | | | |
| Peak temperature reach time (min) | 10 | 10 | 10 | 10 |
| Peak temperature (° C.) | 95 | 95 | 95 | 95 |
| Temperatures of polymer in the second light irradiation step (° C.) | 90→75 | 90→86 | 90→75 | 90→75 |
| Water-soluble polymer | | | | |
| 0.5% salted viscosity (mPa · s) | 132 | 133 | 127 | 124 |
| Insoluble matter content (ml) | Nil | Nil | Nil | Nil |
| Unreacted monomer content (wt %) | 0.05 | 0.09 | 0.09 | 0.10 |

[1]Kinds of photopolymerization initiators:
a: 2,2′-azobis(2-amidinopropane) dihydrochloride (10-hour half-life decomposition temperature = 56° C.)
b: 1-benzoyl-1-hydroxycyclohexane

TABLE 2

| | Comparative Example 1 | Comparative Example 2 | Comparative Example 3 | Comparative Example 4 |
|---|---|---|---|---|
| Photopolymerization conditions | | | | |
| Photopolymerization initiator[1] | a and b | a and b | b | c |
| 10-hour half-life decomposition temperature of a (° C.) | 56 | 56 | — | — |
| The first light irradiation step: | | | | |
| Irradiation intensity (W/m$^2$) | 4.2 | 4.2 | 4.2 | 4.2 |
| Irradiation period of time (min) | 20 | 20 | 20 | 20 |
| The second light irradiation step: | | | | |
| Irradiation intensity (W/m$^2$) | — | 50 | 60 | 60 |
| Irradiation period of time (min) | — | 5 | 30 | 30 |
| Integrated light quantity (J/m$^2$) | — | 15,000 | 108,000 | 108,000 |
| Polymer temperature | | | | |
| Peak temperature reach time (min) | 10 | 10 | 9 | 9 |
| Peak temperature (° C.) | 95 | 95 | 95 | 95 |
| Temperatures of polymer in the second light irradiation step (° C.) | — | 90→87 | 90→75 | 90→75 |
| Water-soluble polymer | | | | |
| 0.5% salted viscosity (mPa · s) | 128 | 124 | 138 | 62 |
| Insoluble matter content (ml) | Nil | Nil | Nil | 80 |
| Unreacted monomer content (wt %) | 0.61 | 0.25 | 0.21 | 0.35 |

[1]Kinds of photopolymerization initiators:
a: 2,2′-azobis(2-amidinopropane) dihydrochloride (10-hour half-life decomposition temperature = 56° C.)
b: 1-benzoyl-1-hydroxycyclohexane
c: Benzoin ethyl ether From the results of Examples 1 to 4 in the above Table 1, it can be seen that Example 1 to 3, in which the water-soluble polymers were obtained by using an azo compound with a 10-hour half-life decomposition temperature of 90° C. or lower as a photopolymerization initiator, carrying out the light irradiation at an irradiation intensity in a range of 0.5 to 7 W/m$^2$ in the first step and then carrying out the light irradiation at an irradiation intensity higher than that of the first step and at an integrated light quantity of 70,000 J/m$^2$ or more in the second step, provided water-soluble polymers which were high in the 0.5% salt viscosity and hence high in molecular weight, had no insoluble matter and hence were excellent in solubility in water, and were as small as 0.10 wt % or less in unreacted monomer content and hence greatly decreased in the unreacted monomer content.

On the other hand, from the result of Comparative Example 1 in the above Table 2, it can be seen that the water-soluble polymer obtained in Comparative Example 1 by carrying out the light irradiation of the first step only without carrying out the light irradiation of the second step, was as very large as 0.61 wt % in unreacted monomer content.

From the result of Comparative Example 2 in the above Table 2, it can be seen that the water-soluble polymer obtained in Comparative Example 2 at an integrated light quantity of 15,000 J/m$^2$ which was lower than the value specified in the present invention in the light irradiation of the second step, was 0.25 wt % in unreacted monomer content and very larger than those of examples 1 to 4.

From the result of Comparative Example 3 in the above Table 2, it can be seen that the water-soluble polymer obtained in Comparative Example 3 by using 1-benzoyl-1-hydroxycyclohexane only as a photopolymerization initiator without use of any azo compound (A) (an azo compound with a 10-hour half-life decomposition temperature of 90° C. or lower) was 0.21 wt % in unreacted monomer content and very larger than those of Examples 1 to 4.

From the result of Comparative Example 4 in the above Table 2, it can be seen that the water-soluble polymer obtained in Comparative Example 4 by using benzoin ethyl ether as a photopolymerization initiator without use of any azo compound (A) (an azo compound with a 10-hour half-life decomposition temperature of 90° C. or lower) had a 0.5% salted viscosity of 62 mpa·s and hence low in molecular weight, had an insoluble matter content of as large as 80 ml and hence was poor in solubility in water, and had an unreacted monomer content of 0.35 wt % and hence very larger in the unreacted monomer content than Examples 1 to 4.

INDUSTRIAL APPLICABILITY

According to the process of this invention, a water-soluble polymer which is high in molecular weight, excellent in water-solubility and greatly reduced in unreacted monomer (residual monomer) content can be smoothly produced by photopolymerization using an aqueous solution of vinyl monomer.

Furthermore, according, to the process of this invention, even in the case where light irradiation is carried out with the depth of the vinyl monomer aqueous solution being kept to be more than 50 mm, polymerization of vinyl monomer can take place sufficiently throughout the aqueous solution, thereby allowing efficient production of a water-soluble polymer having the above-mentioned excellent properties.

The water-soluble polymers obtained according to the process of this invention can effectively be used for polymeric flocculants for coagulation treatment of various kinds of wastewater, thickeners, paper sizing agents, paper strength agents, drainage agents, fiber-modifying agents, dyeing assistants and various other applications, because of the above-mentioned excellent properties.

What is claimed is:

1. A process for producing a water-soluble polymer, including steps of irradiating a photopolymerization initiator-containing aqueous solution of vinyl monomer with light using an azo compound with a 10-hour half-life decomposition temperature of 90° C. or lower as the photo polymerization initiator, which comprises a first step of carrying out the light irradiation at an irradiation intensity of 0.5 to 7 $W/m^2$, and a second or subsequent step of carrying out the light irradiation at an irradiation intensity higher than that of the first step and in an integrated quantity of light of 70,000 $J/m^2$ or more.

2. A process for producing a water-soluble polymer according to claim 1, wherein the light irradiation of the first step is terminated after the temperature of the resultant polymer at the central portion thereof has reached a peak temperature, for shifting to the light irradiation of the second step.

3. A process for producing a water-soluble polymer according to claim 2, wherein the light irradiation of the second or subsequent step is carried out with the temperature of the polymer being kept higher than the 10-hour half-life decomposition temperature of said azo compound.

4. A process for producing a water-soluble polymer according to claim 3, wherein said vinyl monomer is acrylamide alone or a mixture of acrylamide and another copolymerizable vinyl monomer, said mixture containing acrylamide in a proportion of 10 mol % or more.

5. The process for producing a water-soluble polymer according to claim 4, wherein the mixture of acrylamide and another copolymerizable vinyl monomer is a cationic monomer mixture of acrylamide and at least one of quaternary salts and tertiary salts of dimethylaminoethyl (meth) acrylate, the salts constituting 5 mol % or more of the mixture.

6. A process for producing a water-soluble polymer according to claim 2, wherein said vinyl monomer is acrylamide alone or a mixture of acrylamide and another copolymerizable vinyl monomer, said mixture containing acrylamide in a proportion of 10 mol % or more.

7. A process for producing a water-soluble polymer according to claim 6, wherein the mixture of acrylamide and another copolymerizable vinyl monomer is a cationic monomer mixture of acrylamide and at least one of quaternary salts and tertiary salts of dimethylaminoethyl (meth) acrylate, the salts constituting 5 mol % or more of the mixture.

8. A process for producing a water-soluble polymer according to claim 1, wherein the light irradiation of the second or subsequent step is carried out with the temperature of the polymer being kept higher than the 10-hour half-life decomposition temperature of said azo compound.

9. A process for producing a water-soluble polymer according to claim 8, wherein said vinyl monomer is acrylamide alone or a mixture of acrylamide and another copolymerizable vinyl monomer, said mixture containing acrylamide in a proportion of 10 mol % or more.

10. A process for producing a water-soluble polymer according to claim 9, wherein the mixture of acrylamide and another copolymerizable vinyl monomer is a cationic monomer mixture of acrylamide and at least one of quaternary salts and tertiary salts of dimethylaminoethyl (meth) acrylate, the salts constituting 5 mol % or more of the mixture.

11. A process for producing a water-soluble polymer according to claim 1, wherein said vinyl monomer is acrylamide alone or a mixture of acrylamide and another copolymerizable vinyl monomer, said mixture containing acrylamide in a proportion of 10 mol % or more.

12. A process for producing a water-soluble polymer according to claim 11, wherein the mixture of acrylamide and another copolymerizable vinyl monomer is a cationic monomer mixture of acrylamide and at least one of quaternary salts and tertiary salts of dimethylaminoethyl (meth) acrylate, the salts constituting 5 mol % or more of the mixture.

* * * * *